United States Patent [19]

Moorehead et al.

[11] 4,350,567

[45] Sep. 21, 1982

[54] METHOD OF PRODUCING A BUILDING ELEMENT

[75] Inventors: David R. Moorehead; Michael Davis, both of Sydney, Australia

[73] Assignee: CSR Limited, Sydney, Australia

[21] Appl. No.: 182,633

[22] Filed: Aug. 29, 1980

Related U.S. Application Data

[63] Continuation of Ser. No. 27,063, Apr. 5, 1979, abandoned.

[30] Foreign Application Priority Data

Aug. 4, 1978 [AU] Australia ............................ PD5375

[51] Int. Cl.$^3$ .............................................. D21H 3/73
[52] U.S. Cl. ...................... 162/145; 162/146; 162/147; 162/207; 162/181.4; 264/82
[58] Field of Search ............... 162/145, 147, 146, 152, 162/181 R, 181 B, 181.4, 154, 207; 264/82; 106/118, 121, 187

[56] References Cited

U.S. PATENT DOCUMENTS

| | | | |
|---|---|---|---|
| 1,916,949 | 7/1933 | Harrison | 106/88 |
| 2,363,226 | 11/1944 | Brund | 264/82 |
| 2,676,884 | 4/1954 | Hamburg | 162/154 |
| 3,062,669 | 11/1962 | Dilnet | 106/87 |
| 3,149,986 | 9/1964 | Zeimanotal | 106/119 |
| 3,679,445 | 7/1972 | Howe | 106/88 |
| 3,979,217 | 9/1976 | Sutton | 106/88 |

FOREIGN PATENT DOCUMENTS

| | | | |
|---|---|---|---|
| 1947363 | 3/1971 | Fed. Rep. of Germany . | |
| 1915563 | 9/1974 | Fed. Rep. of Germany . | |
| 1368228 | 6/1964 | France . | |
| 49-53217 | 5/1974 | Japan . | |
| 52-49233 | 4/1977 | Japan . | |
| 52-151316 | 12/1977 | Japan . | |
| 149120 | 8/1920 | United Kingdom | 264/82 |
| 217791 | 6/1924 | United Kingdom | 264/82 |
| 1327792 | 8/1973 | United Kingdom | 162/154 |

OTHER PUBLICATIONS

Matsuda et al., Sekkoto Sekkai (125); 170–179, 1973.

*Primary Examiner*—William F. Smith
*Attorney, Agent, or Firm*—Darby & Darby

[57] ABSTRACT

A method for manufacturing a high impart strength carbonate building element is disclosed. Solids and water are mixed to produce a slurry in which the solids consist essentially of at least one alkali earth oxide or hydroxide and an amount of cellulose fibers in the range of 7–40% by weight of solids. The slurry is formed into a gas permeable shape having water-containing voids and a porosity in the range of 35–50%. Carbon dioxide is then caused to permeate into the shape through the voids to convert the hydroxide to a carbonate, thereby imparting high impact strength to the resulting element. This converting step is performed in a short time period, the duration of which depends on the percentage of carbon dioxide present in the processing atmosphere. This time period is about 30 minutes for an atmosphere of 100% carbon dioxide.

10 Claims, 11 Drawing Figures

METHOD OF PRODUCING A BUILDING ELEMENT

This is a continuation of application Ser. No. 027,063, filed Apr. 5, 1979, abandoned.

FIELD OF THE INVENTION

The present invention relates generally to the manufacture of a fibre reinforced carbonate building element by exposing, to the action of carbon dioxide, a shape formed from a slurry of cellulose fibres and a suitable oxide or hydroxide. The invention deals particularly with the case in which the element is a sheet, the hydroxide is slaked lime, the fibres are from waste newspapers, the carbon dioxide is from waste flue gases, and the properties are those normally associated with asbestos cement sheets—in which case the invention produces, from lime and waste products, a sheet that can at least replace asbestos cement sheets in all building applications.

BACKGROUND OF THE INVENTION

The background of the invention will be presented by reference to (A) our practical knowledge of the art and the problems to be overcome, and (B) a study of the prior art literature which we carried out pursuant to, and to check the novelty of, the invention which we have developed to meet such problems. It is against such background that the contribution which the invention makes to the art should be viewed.

(A) Asbestos cement sheets, either flat or corrugated, have a wide present day usage in the building industry in providing durable, reasonably strong and workable, water proof wall and roof claddings having a high dimensional stability; thicker stronger sheets or boards of such material are also usable as the bases of floors in areas such as bathrooms and laundries. The sheets find a particular usage in regions where insect attack would soon destroy timber house claddings such as weatherboards. The durability of asbestos cement in microbial degrading conditions also leads to its use in the manufacture of articles such as prefabricated septic tanks, plant troughs, ground gutters, and to the use of corrugated sheets as fence panels.

Unfortunately it has been recently discovered that asbestos fibres are dangerous to human health—and that people working in an environment involving air suspension of such fibres may subsequently develop lung cancer and other respiratory diseases. The dangers appear such that many countries of the world have either introduced, or are considering the introduction of, a variety of restrictions on the use of asbestos fibres. As medical evidence of the dangers accumulates, it is possible that all concerned countries may either prohibit the mining or use of asbestos fibres or may require safeguards, the implementation of which would substantially increase the cost of manufacturing and using asbestos cement fibre sheets.

In view of the above dangers, and/or potential cost increases, there is clearly a need for a building sheet that does not include asbestos fibres but that does, at the same time, have similar properties to an asbestos cement sheet such as: comparable cost, low water permeability, density, strength, flexibility, durability, fire resistance, surface smoothness, handleability, workability and in-service characteristics (re the last three properties see immediately below). Briefly, our invention, as hereafter defined and described, meets such need.

*Note:* The term "handleability" refers to the ability of a sheet to be carried and fixed without breaking—and is usually related to measurable characteristics such as: modulus of rupture, modulus of elasticity, hardness, impact strength and apparent specific gravity (these properties are defined in the ensuing description). The term "workability" refers to the ability of a sheet to be cut, nailed, drilled and holed. Finally, the expression "in-service characteristics" refers to durability and the ability of a sheet to stand up to the stresses that it will experience during its lifetime after installation; such stresses include those resulting from hygro-expansion and freeze thaw conditions. It is important that a building sheet have these properties.

In seeking a solution to the problems associated with the use of asbestos fibres, one approach has been to replace such fibres with glass fibres. However, this approach on the whole has not been successful, because of the cost of the glass fibres and the lack of durability resulting from the solubility of glass, over a period of time, in a cement environment (throughout this specification, "cement" means a Portland-type cement). Whilst solubility can be countered in part by coating the fibres, this in turn introduces other problems as well as leading to further cost increases. Attempts to manufacture "special" glass formulations, having a low solubility, have also failed because of cost considerations. A further difficulty has been that glass/cement slurries have filtering characteristics that make them difficult to form on standard asbestos cement forming machines.

Another approach has been to replace the asbestos fibres with cellulose fibres. However, this approach appeared regressive since asbestos fibres, when first introduced, overcame strength and durability problems associated with early prior use of cellulose fibres for reinforcing cements of the Portland type. These prior problems will now be discussed briefly since, being associated with the use of cellulose fibres, they are among problems which one might not have expected to be overcome by the present invention.

The strength problem is briefly as follows: lignin, and other impurities, associated with cellulose fibres interfere with the setting of the cement. Cement, when set, does not seem to have a good bond with the surfaces of cellulose fibres—and thus, inordinate movement can take place between the fibres and the set cement. In addition, difficulties have even been encountered in the mixing of a cement containing cellulose fibres.

Durability problems typically arise because cellulose is an organic material and is subject to microbial degradation—and possible termite attack. The problem of microbial degradation can be especially dangerous if the article manufactured from the fibre reinforced cement has a structural use since the article may suddenly fail at some unexpected date after installation. Such a sudden failure usually results because of property changes, such as loss of alkalinity, that continuously takes place in the set cement, such changes producing a more favourable environment for microbes (the problem of termite attack on cellulose is of course well known). Hygro-expansion is also a problem. A portland cement matrix is itself hygro-expansive as are cellulose fibres—which means that the quantity of cellulose which may be incorporated in the cement matrix is limited by consideration of the hygro-expansion.

The above prior problems—which in the past were overcome by replacing cellulose fibres by asbestos fibres—have not been reintroduced by the present invention because, in our invention, we overcome the problems by replacing cement by a suitable oxide or hydroxide and by replacing the water setting process by a carbonation hardening process whereby the oxide or hydroxide is converted into a carbonate mass. In addition, the present invention is predicated on our surprising discovery that if one forms the slurry (of cellulose fibres, water, and selected oxides or hydroxides) so as to have a porosity and cellulose content within specified ranges, the product of the subsequent carbonation step will be a fibre reinforced building element which (as will be seen hereafter) is a completely satisfactory replacement for the asbestos cement sheets of the prior art.

(B) Our discovery, as indicated above, led us to study the prior art literature—which study revealed several publications that fall into the category of related background material.

None of these documents, however, describes a method as defined hereafter, and in the appended claims. In particular, none of the methods described in these documents produces an article or shape having an uncarbonated porosity and cellulose content within the ranges laid down in this specification.

SUMMARY OF THE INVENTION

The inventive concept is embodied, broadly, in a method of manufacturing a matted felt shape, suitable for carbonating so as to form a fibre reinforced carbonate building element. Such method comprises the steps of (a) selecting solids including (i) at least one alkali earth oxide or hydroxide and (ii) cellulose fibres, and mixing the solids with water to produce a slurry, and (b) forming the slurry to the matted felt shape, with such shape containing voids that are connected and that contain water;

wherein the selecting and forming is done so that the solids include the cellulose fibres in the range 7 to 40% by weight of solids and the matted felt has a porosity in the range 35 to 50%, porosity being the volume of the voids within the shape expressed as a percentage of the volume of the whole shape.

The invention further provides a method of manufacturing a cellulose fibre reinforced carbonate building element which comprises the steps of (a) mixing solids and water to produce a slurry in which the solids include at least one alkali earth oxide or hydroxide and an amount of cellulose fibres in the range 7–40% by weight of solids;

(b) forming the slurry as a gas permeable shape having voids that contain water, characterized in that the shape has a porosity in the range 35 to 50%, where porosity is the volume of the voids within the shape expressed as a percentage of the volume of the whole shape; and (c) causing carbon dioxide gas to permeate into the shape by means of the voids thereby converting the hydroxide(s) to carbonate(s) and so producing the element.

The invention also includes within its ambit, shapes and building elements—having the characteristics as above defined—both per se and as produced by the foregoing methods.

The advantages, and other features, of the invention will be elaborated in the ensuing "General Description" of the invention wherein reference is made inter alia (and not necessarily sequentially) to (i) positive objectives and their attainment, (ii) terminology employed, (iii) properties of the element of the invention, (iv) preferred sub-generic details, with theoretical discussion as appropriate, (v) parameter considerations, and (vi) detailed performance features.

GENERAL DESCRIPTION

Our invention has three prime objectives: the first is to achieve a high impact strength in the fibre carbonate building element and generally match the properties of asbestos cement sheets. The second is to achieve a higher rate of carbonation than in the prior art. The third is to utilise waste materials (as flue gas and waste paper) thereby protecting the environment and preserving virgin resources. As will be evident from the following description, all objectives are met.

The properties of the building element produced in accordance with the invention (hereafter often simply called the invented product for convenience) are set forth in Table 1 hereafter—and are discussed immediately below.

Bending Strength

The modulus of rupture of the invented product as compared with that for asbestos cement:

|  | Invented Product | Australian External Grade Asbestos Cement | ISO Specification for Asbestos Cement |
| --- | --- | --- | --- |
| Directional Average MOR - Wet testing MPa | 9.8–19.5 | 14.4 | 22.0 |
| Estimated Dimensional Average MOR - Dry testing MPa | 16.7–33.2 | 22.5 | 33.0 |

As may be seen, bending strengths of the invented product are similar to those of asbestos cement.

Impact Strength

The Izod impact strength of the invented product varies from 1650–3525 $J/m^2$ whilst Australian external grade asbestos cement varies from 1350–2400 $J/m^2$.

Elastic Modulus

The modulus of flexural elasticity of the invented product varies from 0.6–2.3 $MPa \times 10^4$.

Hygro-Expansivity

The hygro-expansivity of the invented product varies from 0.17–0.57% whilst Australian external grade asbestos cement shows a figure of 0.28%.

Hardness

The hardness indentation of the invented product was 1.41–2.56 mm. The figure for Australian asbestos cement is 1.10–0.74 mm. The somewhat lower hardness of the invented product reflects in excellent workability.

In summary, the major properties of the invented product are demonstrably similar to, or better than, those of asbestos cement.

The specification utilises a number of regularly-repeated expressions (including those featured in the above discussion of properties), the precise meanings of which are important to a full appreciation of the invention. The following expressions are to be understood as having the meanings indicated.

Porosity

Porosity may be defined as the volume percentage of voids. All porosity figures in this specification are for the uncarbonated body. Porosity of a composite may be calculated by subtracting the volume of the uncarbonated components from the compacted volume of the composite.

Degree of Carbonation

This is the fraction of hydroxide converted to carbonate during curing with $CO_2$ gas.

Apparent Specific Gravity (ASG)

This is the apparent density of the dry carbonated composite expressed in $Kg/m^3$. It is calculated by dividing the weight of the body by its external volume which includes the voids within the body.

Permeability

This is the flow rate of air drawn through an area 52.8 $cm^2$ of a dry composite under a pressure difference of 28" of Hg multiplied by the thickness of the composite.

Flow is measured in litres/min and thickness in mm (l/min $\times$ mm).

Impact Strength

Impact strengths were measured with an Izod impact tester on notched, moisture equilibrated samples of the composite. The directional average (of at least 4 test results) are reported as:

Impact Strength $I$ = Energy ($J$) /area ($m^2$)

Modulus of Rupture (MOR)—or Bonding Strength

The MOR measurements were carried out on samples that had been soaked in water at least 18 hours prior to test. The tests were carried out on $13 \times 13 \times 0.45$ cm samples tested in an Avery Universal Testing Machine.

The span of the bending test was 11.5 cm and the rate of loading was maintained at a constant value. Modulus of rupture results were calculated in MPa from the formula $$MOR(Mpa) = (3/2) \times (W \times l/bd^2)$$

where
W = load applied
l = span
b = width of sample
d = thickness of sample

Results reported are of those made on water saturated test pieces.

Modulus of Flexural Elasticity

The MOE estimates were made by recording the deflections of the MOR test samples. The modulus was calculated from the formula $$E = Wl^3/4bd^3\Delta$$

where $\Delta$ is the deflection of the sample.

Hardness

This method measures the indentation of a falling metal rod on the surface of a moisture equilibrated sample. The indentation is made by a cone shaped end of the rod. The measurement is recorded in mm. The height of the drop is 229 mm from the sample surface.

Hygro-Expansion

Hygro-expansions were measured on samples 24 mm in length. Dimensional change was measured between water saturation and 102° C. oven dry conditions.

Nailability

The nailability test was carried out on atmosphere aquibrate samples on a line 0.25 in from the edge of the board. Conventional $25 \times 2.0$ mm flat head nails were hammered flush with the board surface. Results were deemed unacceptable when the board split.

Preferably, the alkali earth metal employed in the practice of the invention is calcium. The basic equations involved in the production of a calcium carbonate matrix are set forth below, the calcium carbonate being precipitated as a mass of interlocking fine crystals, the volume of which is approximately 12% greater than the volume of the calcium hydroxide from which it was derived.

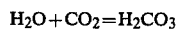

$$H_2O + CO_2 = H_2CO_3$$

$$Ca(OH)_2 + H_2CO_3 = CaCO_3 + 2H_2O + 17.7 \text{ K cal}$$

We believe that the excellent physical properties of the invented product are due to the combination of fine microstructure, optimal porosity and optimal cellulose fibre content. These characteristics features are now discussed, individually and collectively.

The fine microstructure developed in the invented product is demonstrated with reference to FIGS. 1 to 4 wherein.

Figure 1:
FIG. 1 shows a greatly magnified photo of a fracture surface of a hydrated lime compact.
Figure 2:
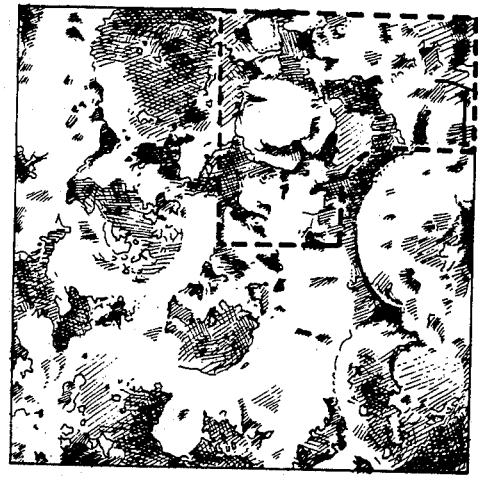
FIG. 2 shows a photo of a similar surface after carbonation of the compact was carried out for twenty-four hours at 60° C.

Referring firstly to FIGS. 1 and 2, both surfaces include a spherical glass aggregate that is not a characteristic of the present invention. The region X in FIG. 1 reveals large sized particles of hydrated lime and pores therebetween. In the region Y in FIG. 2, it is seen that the calcium carbonate particles are much smaller, appearing (in the figure) as a white powder—and have expanded internally into the pores to produce a material having a finer microstructure.

As indicated above, the expansion taking place by the conversion of calcium hydroxide to calcium carbonate can be calculated as approximately 12% of the volume of the hydroxide. As we have observed that the external dimensions remain constant during this process, the expansion must be an internal expansion.

Figure 4:
FIG. 4 shows a photo, under magnification similar to that in FIG. 2, of a fractured surface of a set cement comprising mainly hydrated calcium silicates.
Figure 3:
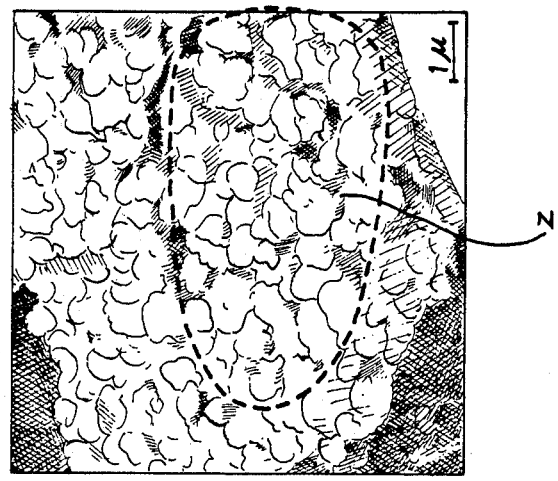
FIG. 3 shows a photo under much greater magnification of a region Z similar to the region Y shown in FIG. 2.

FIGS. 3 and 4 (the cement of the latter having been allowed 16 to 18 hours in which to set, and having then been exposed in an autoclave for 8 hours at a temperature in the region 150° to 180° C.) make an interesting comparison. The darker regions in FIG. 4 between the lighter threadlike crystal edges of the silicates are the pores—and it is clear that the pores in FIG. 3 are much smaller and more numerous than those in FIG. 4. The carbonate of FIG. 3 is seen to have a finer microstructure than the cement of FIG. 4.

In one preferred embodiment of our invention (as foreshadowed above), the compound that we mix with the cellulose fibres and water is calcium oxide and/or hydroxide—so that when the sheet is manufactured in accordance with the invention, there are residual calcium and hydroxide ions in contact with the fibres until such time as carbonation is completed. This contact includes the case when the ions are absorbed into the fibres via the surface cavities—and we believe that such absorption or ion exchange may well provide an immunity to microbial or termite attack. Over a long period of time the contact may calcify the fibres. The lack of large pores, and the previously discussed bonding, also enable us to use comparatively short low cost fibres—and in another preferred aspect of the invention, we obtain such fibres from waste nespapers. As will be appreciated however the lengths of fibres used in newspapers can vary considerably. The waste newsprint can be of softwood or hardwood origin—and be prepared in a variety of pulping processes.

In using waste newsprint fibres, in one experiment, the carbonated sheet had a higher modulus of rupture (MOR) than a similar sheet using kraft fibres. This finding was surprising since the newspaper fibres used are usually considered inferior to kraft fibres (in that they are shorter having an average length of about 1 mm as opposed to about 4 mm). It would also have been expected that kraft fibres should be superior in the environment of our invention because of their higher level of purity. In this connection, the presence of lignin and extraneous materials is usually considered to be detrimental to setting processes.

Figure 5:
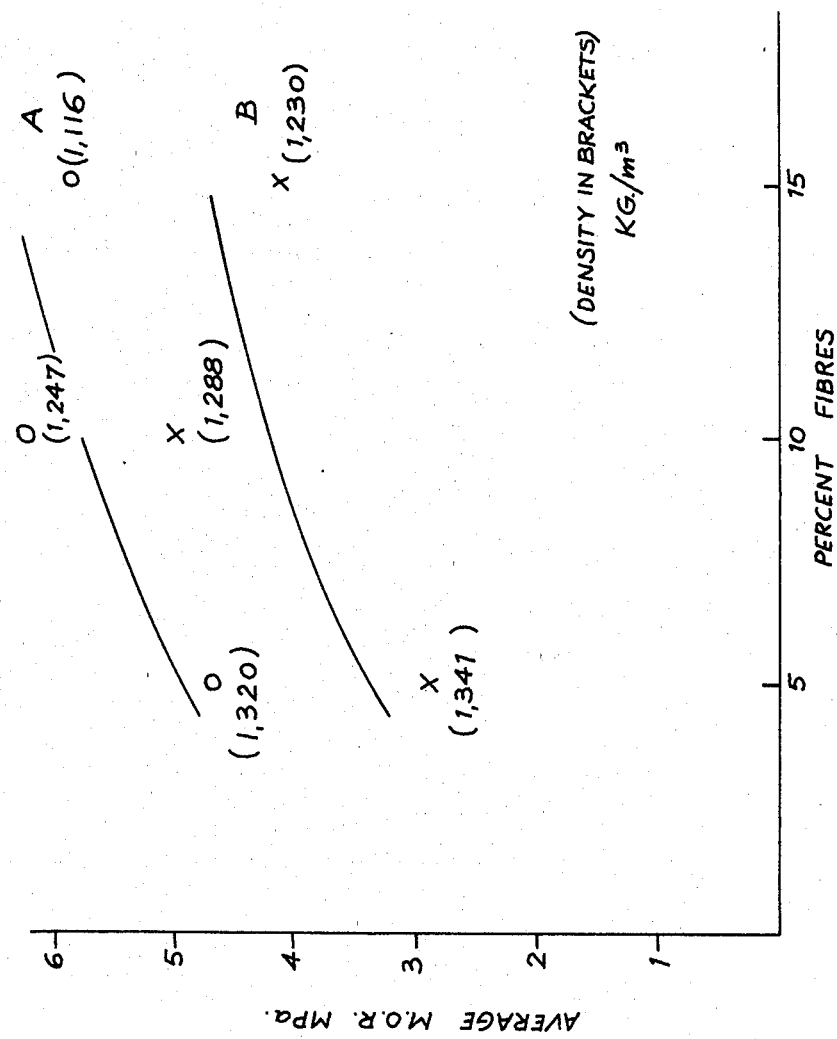

The above-mentioned higher modulus of rupture is illustrated in FIG. 5 which shows values of MOR for sheets having varying percentages of fibres as indicated. Curve A is for sheets containing newsprint fibres and curve B is for similar sheets containing kraft fibres. Each sheet contained: 1% of "E" glass fibres, 1% of polypropylene fibres; calcium carbonate and a small percentage of unconverted hydrated lime. Comparison of the curves clearly illustrates the above surprising finding.

Figure 6:
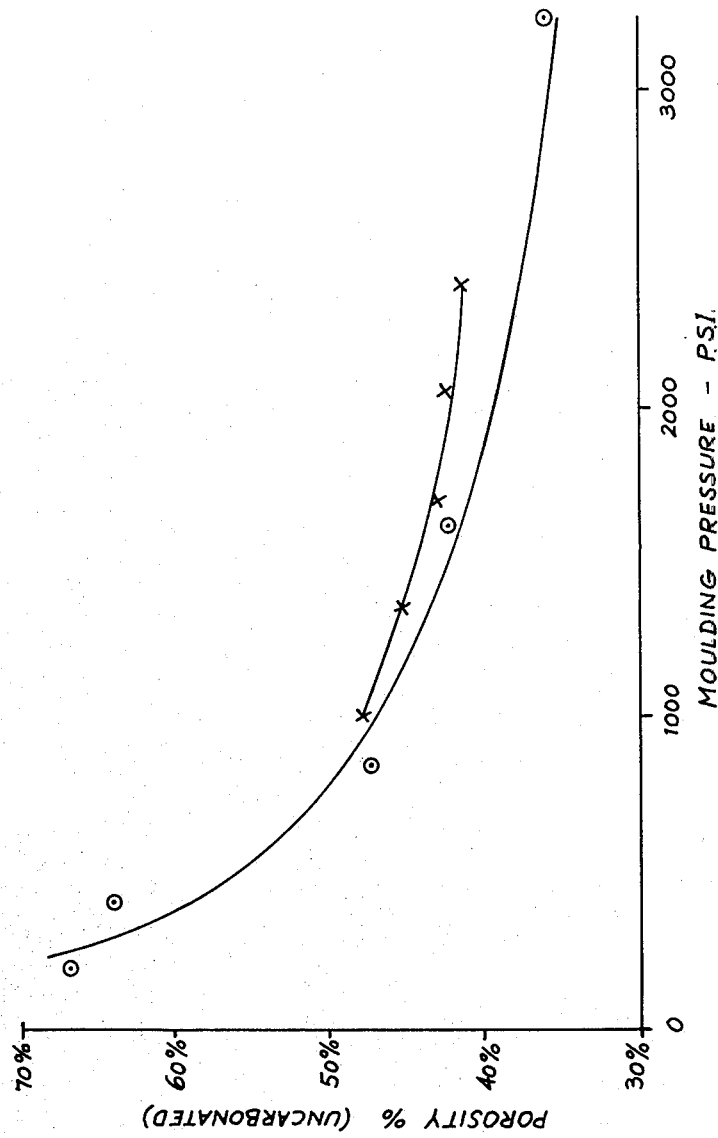

As indicated earlier, selection of optimal porosity is central to the invention. Porosity is of course related to forming pressure but the relationship is not simple. This lack of simplicity is illustrated by examples as depicted in accompanying FIG. 6 which shows relationships between uncarbonated porosity, and forming pressure in lbs/sq inch, for two different compositions of solid materials comprising: waste paper fibres, calcium hydroxide, polypropylene fibres and "E" glass fibres. The points marked 'o' correspond to percentages by weight of the materials as follows: 10%, 88%, 1%, 1%. The points marked 'x' correspond to equivalent percentages as follows: 20%, 79%, 0.5%, 0.5%. When a hydrated lime more plastic than that of the above two examples was used, forming pressure for a given porosity was halved.

Turning to the cellulose fibres, a preferred range, within the broad range indicated above, is 10-30%. As indicated in the properties discussed heretofore, the product has adequate strength without excessive hygro-expansivity.

Figure 7:
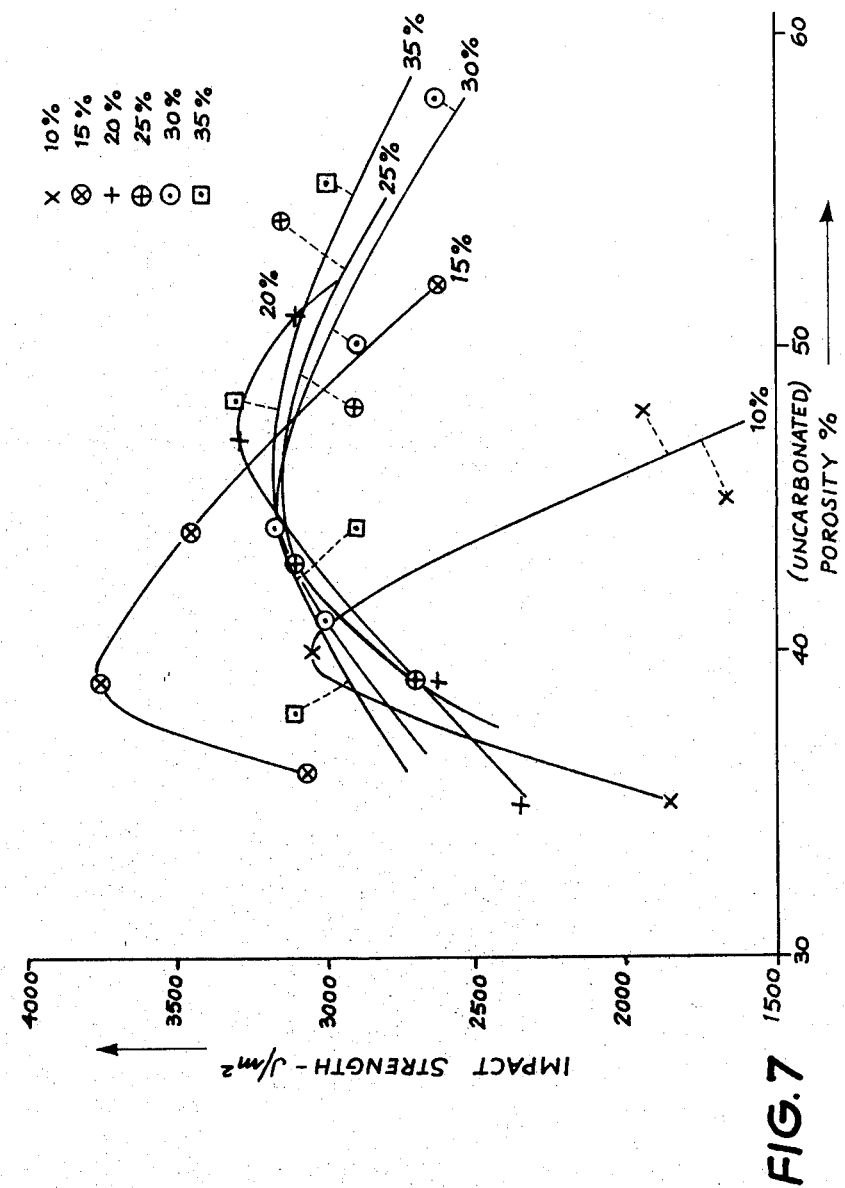

As indicated above, the excellent physical properties of the invented product are believed to arise from the interaction of optimal porosity and cellulose content, fine microstructure and internal expansion. Thus the fine microstructure results in effective grip on the cellulose fibre (more so than a coarse grained microstructure where point contacts on the fibres would be fewer). Election of optimal porosity prior to carbonation is also responsible for effective grip (and in addition internal expansion of the matrix forces carbonate into the pores and into contact with the fibres). The combination of fine microstructure, optimal porosity and cellulose content and internal expansion results in fibre gripping which is sufficiently tight to give the high observed bending strength. However sufficient slip can take place to give the observed high impact strengths. The hypothesis that some slip is necessary to achieve high impact strengths is supported by the plot of impact strengths versus uncarbonated porosity at various cellulose contents (FIG. 7) where in fact impact strength optima are observed. We consider that where the porosity is decreased beyond the impact strength maxima, the material behaves as a brittle mono-phase ceramic-like material since the modulus of elasticity of cellulose is similar to that of calcium carbonate.

When the broad method of our invention is performed we have found that sheets of reasonable strength can be achieved if the weight ratio in the slurry of cellulose fibres (to hydroxide plus aggregate when present) is kept in the range 5% to 40%. If, however, sheets of superior impact strength and acceptable hygro-expansion are required, this weight ratio is optimally kept in the range 10 to 30%. In all instances, the compacted shape has a porosity in the range 35 to 50% before carbonation.

Figure 8:
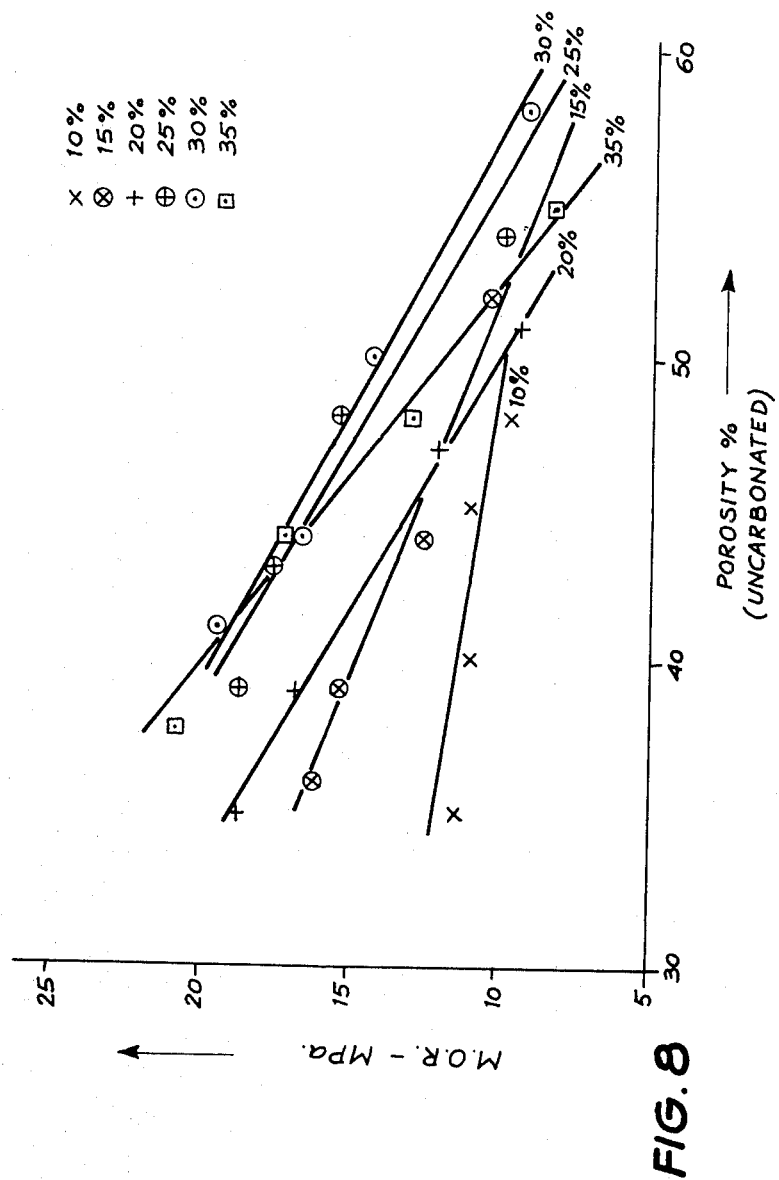

In the above we have generally referred to our invention as being a method of manufacturing a building sheet that is a suitable replacement for asbestos cement sheets and we have indicated that our sheet must hence have a variety of properties that are as good as, if not superior to, the equivalent asbestos cement sheet properties. We have discussed the factors involved in the manufacture of our sheet—and we have also made reference to our discovery of the importance of the uncarbonated porosity and cellulose content. We have hypothesised why porosity and cellulose content are central to the invention—and we have specified the range of the uncarbonated porosity as being between 35 and 50 percent of the uncarbonated sheet. The influence the range has on the sheet properties is summarized briefly as follows:

When the porosity is less than 35% then the carbonated sheet is unacceptable because impact strength is low and the sheet is too hard, unnailable and unworkable. When the porosity is greater than 50% then the carbonated sheet is unacceptable because the wet bending strength is less than 11 MPa which is too low (see FIG. 8). For porosities such as this, the fibres are not properly gripped and pull-out occurs when the sheet is subjected to bending or impact loads.

Returning to the cellulose fibre content that is associated with the specified porosity range, there are (as previously indicated) ranges of cellulose fibres that are important if sheets are to be manufactured to have the required properties. Preferably and optimally, these ranges of cellulose fibres are within a general range of 10 to 30% by weight of solids in the slurry used to form the sheet. Thus, when the cellulose content is less than 10%, the carbonated sheet is less acceptable because wet bending strength is generally less than 11 MPa and the sheet is relatively hard and difficult to nail. When the cellulose content is greater than 30%, hygroexpansion is usually too high (and durability under freeze-thaw conditions may be suspect).

Figure 9:
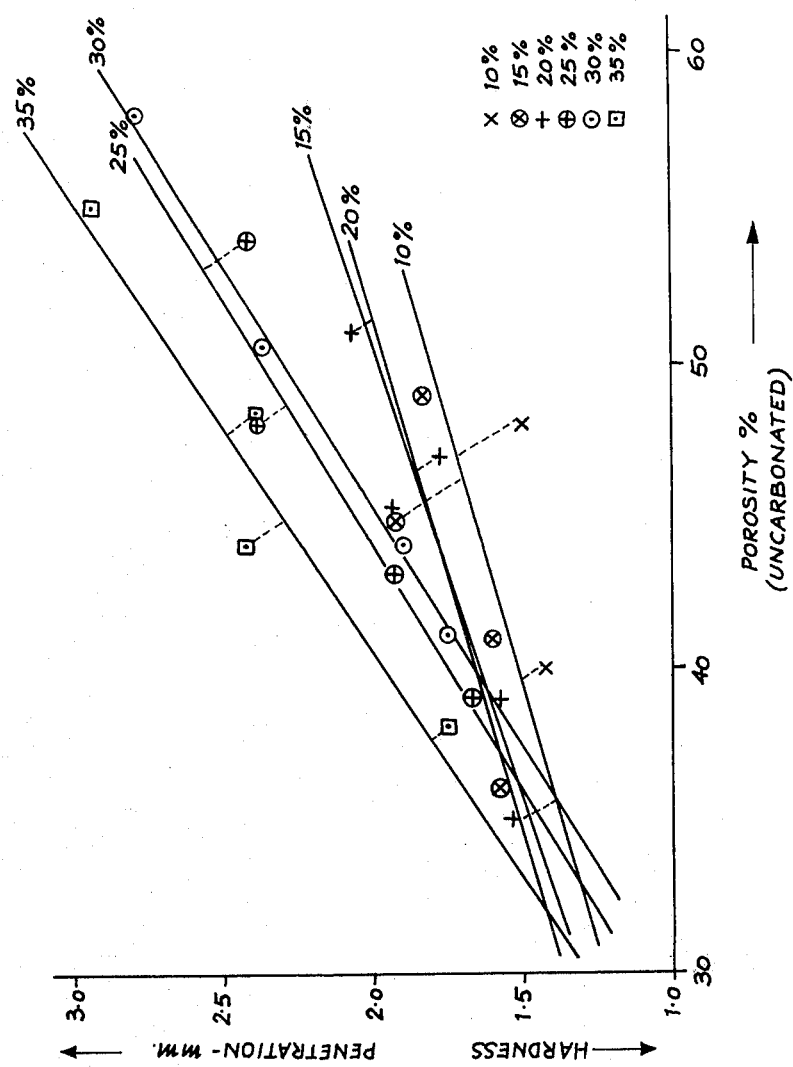

Another property associated with the instant porosity range is hardness which is measured by the procedure indicated heretofore. FIG. 9 plots penetrations as linear functions of porosity for the sheets of varying cellulose content.

Figure 10:
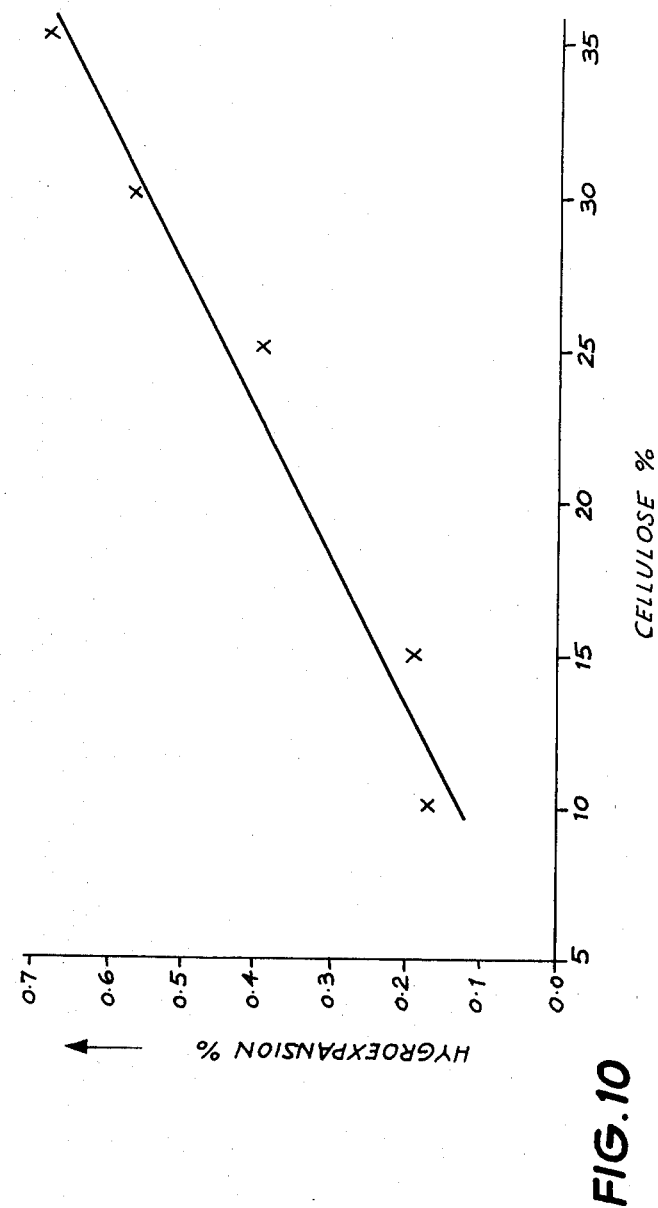

Also associated with porosity, as it relates to inservice characteristics, is moisture stability of the sheets when fixed and exposed to varying weather conditions; if the sheets are not stable then there is too much expansion and contraction and nails will pull out and closely abutting sheets will buckle. In tests, we took hygroexpansion as a measure of moisture stability and the tests were conducted on sheets having cellulose amounts of 10%, 15%, 25%, 30%, and 35%. The sheets were first soaked in water and then dried in an oven at 102° C. Hygro-expansion was calculated for each sheet by measuring the linear shrinkage that took place during drying and expressing the shrinkage as a percentage. The results of the tests are plotted in FIG. 10—and it is noted that cellulose amounts in excess of 30% lead to hygro-expansions that are unacceptable.

As mentioned earlier one objective of the invention is to achieve a higher rate of carbonation than in the prior art. The attainment of this aim will now be described. Many attempts have been made in the prior art to manufacture carbon dioxide hardened lime products. In each case, the attempt has suffered from long residence time requirements for carbonation. Thus in cases where the lime body is carbonated in a carbon dioxide atmosphere of concentration 10–100% $CO_2$, residence times have typically been from about ten hours to many days. Such long residence times have meant that batch processing has been mandatory—and costs have been high.

In contradistinction to the above, a surprisingly high rate of carbonation has been obtained in the instant invention. Thus carbonation times of 0.5 and 2.5 hours are typically obtained with 100% and 28% carbon dioxide respectively. Such high rates allow carbonation to be carried out in automated continuous tunnels at low cost.

The exceptionally high rate of carbonation obtained with the invention appears to be due to our ranges of porosity and cellulose fibre content. These ranges results in a body (e.g. a lime body) of high permeability as well as giving the required physical properties to the product. It is possible that the cellulose fibres open up the structure, and that the fibres increase gas permeability. Tests have been carried out which demonstrate directly the importance of our cellulose content range in increasing the rate of carbonation for boards in our porosity range:

A board was made consisting of 15% newsprint fibre, 84% hydrated lime, plus 0.5% "E" glass fibre and 0.5% polypropylene fibre (these percentages were based on slurried raw material solids). After filtration and pressing, the porosity of the lime body was 39%. This body was carbonated with 100% $CO_2$ for one hour and this resulted in the conversion of about 80% of the hydrated lime.

A second board was made in which the slurried raw materials consisted of 5% newsprint and 94% lime, plus 0.5% "E" glass and 0.5% polypropylene. After filtration and pressing the porosity was 36%. This body was carbonated in 100% $CO_2$ for one hour, and this resulted in the conversion of about 30% of the hydrated lime. Thus the board containing only 5% cellulose carbonated much more slowly than did one containing 15% cellulose (which had a carbonation rate typical for the ranges of this invention).

A third board was made containing no cellulose, and consisting of hydrated lime only. The porosity was 42%. This board was carbonated in a like manner to that of the first and second boards above. It was not possible to establish the carbonation rate, since the body developed micro-cracks and then broke up. Whilst not actually showing whether the carbonation rate was even slower when no cellulose was present, this experiment clearly demonstrates another matter viz. the significance in our invention of the combination of porosity and cellulose fibre content. Thus when a board was made within our porosity range, but without the prescribed cellulose fibre content, the result was quite unsatisfactory.

The prior art in respect of carbon dioxide hardened lime bodies has pointed to (the importance of) carbonation being carried out upon a partially dried body (i.e. one in which the pores are not completely blocked with water). In all of the present work, the initial moisture content of boards being carbonated corresponded to approximately 50% of the pore volume being filled with water—which is squarely within our preferred range of water content viz. 40-60% (e.g. 45-55%) by volume of the voids. This approach to selecting the moisture content prior to carbonation may have contributed to the high carbonation rate obtained with the invention.

As mentioned above our invention allows the utilization of two waste materials. Thus, we have shown that newsprint (waste newspapers) give highly effective reinforcement in the invented product, results obtained being equal to, or better than, with other more costly sources of cellulose (see FIG. 5). We have also shown that the invented product is very readily carbonated— which means that flue gases containing low percentages of carbon dioxide may be utilised.

PREFERRED ANCILLARY COMPONENTS AND OTHER FEATURES

To reduce costs it may be advisable to include an appropriate aggregate (as indicated heretofore) into the slurry. One aggregate that meets those requirements is a finely ground carbonate of the same type as comprises the finished sheet (e.g. $CaCO_3$). When calcium oxide and/or hydroxide is being used to produce our maximum strength sheet, the aggregate is calcium carbonate ground to have particle sizes less than 200 BS mesh (e.g. in the range 50-200) and mixed with the materials so that the ratio in the slurry of calcium carbonate to calcium hydroxide can be up to 2:1.

When the matted felt has been formed, it is generally compacted into the required shape without being disrupted; for example it can be formed in a die directly beneath a press, or it can be formed on a conveyor and pressed while travelling on the conveyor. It may however be necessary to disrupt the matted felt—as for example when it is formed as separate layers on a makeup roll and then removed. In such cases glass fibres added when mixing the slurry appear to increase the green strength of the matted felt. A preferred range of glass fibre is 0.5-5.0% by weight of dry materials in the slurry. Whilst the glass fibres are desirably of the alkali-resistant type, this is merely a preferment as the overall strength of our sheet (for the reasons indicated heretofore) permits the use of much cheaper "E" type glass fibres.

Figure 11:
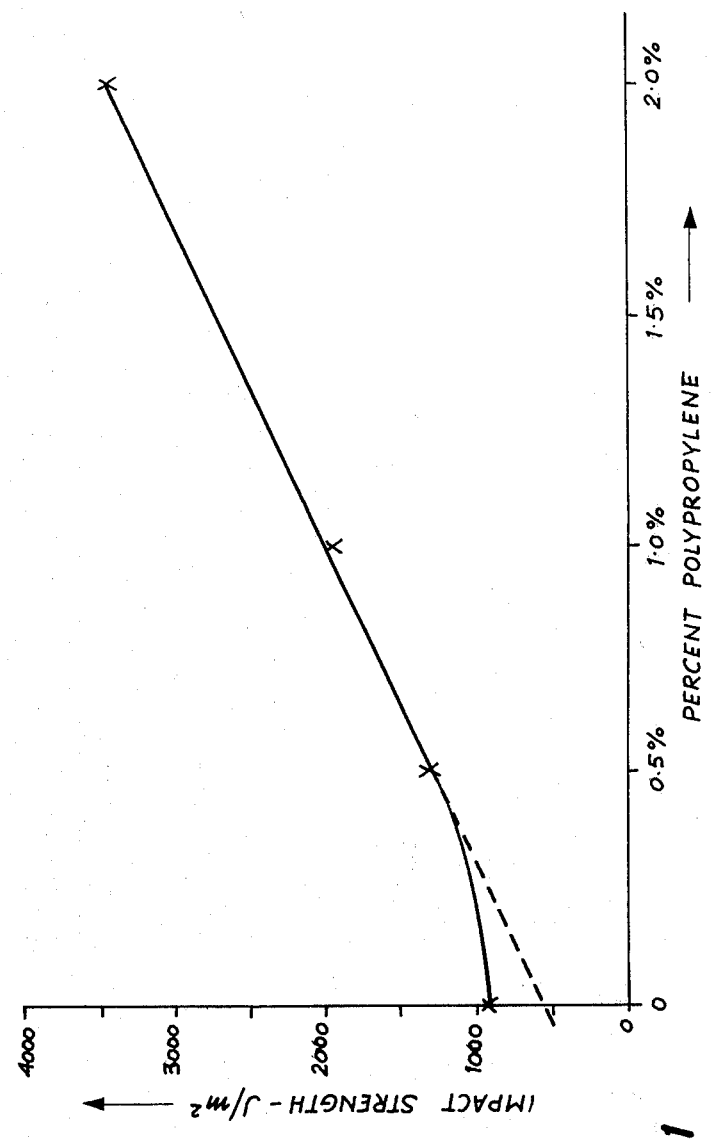

Other fibres or classes of fibres can be added within the broad scope of our invention, one such class of fibres comprising those having a Young's modulus in the range 200 to 300 Kg/mm$^2$ such as for example polypropylene fibres. We have found that a small addition to the slurry of polypropylene fibres (e.g. in the range 0.1-5%) leads to a noticeable enhancement of the nailability properties of the sheets. In this connection, one method of assessing nailability arises from the observation that high impact strength sheets suffer less breakage during nailing than low impact strength sheets, and FIG. 11 plots impact strengths in Joules per square meter for sheets containing 0, 0.5, 1.0 and 2.0 percent of polypropylene fibres. From the plot we note that there is a significant improvement in impact strength for additions of 0.5% and greater.

When the slurry is being formed into a matted felt, the addition thereto, and distribution therein, of a suitable flocculant can be of assistance viz. to enable the said formation to be carried out as quickly as possible (so that the fibres and hydroxide remain distributed as uniformly as possible in what is to become the finished sheet) and to increase the filtration productivity. When calcium hydroxide is present in the slurry, and the fibres are those of waste newsprint, the flocculant may preferably be a high molecular weight anionic emulsion polyelectrolyte—which could be present in an amount of 0.1 to 0.5% by weight of flocculant to dry weight of materials.

In the following paragraphs, a particular embodiment of our invention is described. This embodiment demonstrates how the method of the invention is able to convert waste materials into a high impact strength building sheet having all previously described characteristics usually associated with asbestos cement sheets. The waste materials are newsprint and flue gas from a lime kilm. The building sheet made in accordance with the method is typically of 4.5 mm thickness.

1. INTRODUCTORY

In performing the present invention it is first necessary to choose a particular porosity, and a particular cellulose fibre percentage, according to the requirements of the building element that is to be manufactured. The volume of the element is then determined and the volume of the fibres and solids in the carbonated matted felt shape is obtained using the porosity chosen. Weights of fibres and solids per unit volume of the felt are than calculated from the determined volume knowing the density of the fibres and of the solids. A slurry is then mixed with a known weight of the fibres and solids such that the ratio of the fibre weight to the solid weight is as calculated above.

The slurry is poured into a mould, in which the matted felt is to be formed, in a quantity sufficient to contain the determined volumes. The slurry is then dewatered, and compacted by pressure if necessary, to form the matted felt shape. In this embodiment, the amount of water in the shape is calculated and water in excess of approximately 50% by volume of the voids is then removed by heating; the amount of water removed is monitored by weighing. The matted felt is then cooled and is ready for carbonation. 2. Proceeding, the materials chosen, and the percentages of the slurried materials on the basis of dry weight, were as follows:

| | |
|---|---|
| waste newsprint: | 20% |
| hydrated lime (94% Ca(OH)$_2$, 3% CaCO$_3$, 3% other; particle size 100% less than −200 mesh): | 78.5% |
| PVA coated "E" glass fibres of average length 20 mm: | 0.5% |
| 15 denier polypropylene fibers of average length 20 mm and a Young's modulus in the range 200-300 kg/m$^2$: | 0.5% |
| flocculant (that available as "Alfloc 6731" - Reg. Trade Mark): | 0.5% |

The waste paper (newsprint) was initially soaked in water for approximately 10 minutes, and then pulped in a conventional high speed mixer. Hydrated lime and "E" glass and polypropylene fibres were added to the mixer and mixed into the paper pulp. Solids content at this point was about 10% w/v. Further water was then added, with mixing, to reduce the solids content to 5% w/v. Finally the flocculant was added to the slurry and gently stirred until flocculation occurred.

As soon as flocculation occurred, the slurry was quickly poured into a sheet shaped forming box, and a vacuum of 50-60 KPa (15-18 inches of mercury) was applied for approximately 45 seconds through a 30 mesh screen in the bottom of the box to de-water the slurry. The amount poured was sufficient to form a de-watered matted felt approximately 12 mm thick. The matted felt so formed contained approximately 100% of water by weight of dry solids.

The felt was then transferred to a press, and subjected to a forming pressure between opposing flat plates sufficient to compress the matt to a thickness of 4.5 mm, and an uncarbonated porosity within the required (35-50%) range. In this particular embodiment, the porosity of the pressed matt was 42%. The matt was then transferred to an oven and dried at 80° C. until the pores were half filled with water (i.e. the amount of water was within the range 45-55% by volume of the voids). This was determined by weighing the wet board during drying and drying to a predetermined weight.

The partially dried matt (or green sheet as sometimes designated) was then cooled to approximately 60° C. and placed in a carbonation chamber, through which was circulated a flue gas (from a lime kiln) containing carbon dioxide. The gas contained a concentration of 28% (on a volume basis) of carbon dioxide. Before the flue gas was circulated its temperature was reduced to about 40° C. A satisfactory carbonation (conversion of the hydrate) was obtained in 2.5 hours.

At the end of the carbonation period the sheet was removed from the carbonation chamber and subjected to (inter alia) impact strength tests. In relation to this particular parameter, the sheet was found to have an impact strength of 3660 J/m$^2$—and no difficulties were experienced in nailing.

In this embodiment, and as indicated in the earlier description, the alkali earth metal is preferably calcium. However, it is to be understood that the expression "alkali earth" has its normal meaning in this specification—so that other metals such as magnesium can be substituted for calcium if desired.

In conclusion:

(i) attention is directed to Table 1 which follows immediately hereafter. As indicated in the earlier discussion thereon, this table sets out the properties of the invented product (ii) the preferred nature of much of the foregoing description is stressed. As long as the basic criteria, as broadly defined, are observed, any matters falling therewithin, not being critical in themselves, can be varied in accordance with situational and/or environmental requirements.

TABLE 1
TABLE OF RESULTS

| Sample No. | % News-print | Degree of Carbonation α | ASG kg/m³ | Uncarbonated Porosity % | Permeability 1/min × mm | Impact Strength J/m² | MOR (wet) MPa | Hardness Penetration mm | Elastic Modulus MPa × 10⁴ | Acceptable Nail-ability | Hygro Expansion % |
|---|---|---|---|---|---|---|---|---|---|---|---|
| L17 −1 | 10 | .90 | 1309 | 48 | 18.8 | 1950 | 9.8 | 1.49 | 2.30 | x | 0.17 |
| −2 | " | .85 | 1399 | 45 | 11.3 | 1650 | 11.0 | 1.88 | 1.30 | x | " |
| −3 | " | .77 | 1485 | 40 | 5.6 | 3050 | 11.0 | 1.41 | 1.60 | x | " |
| −4 | " | .59 | 1523 | 35 | 2.7 | 1850 | 11.2 | 1.44 | 1.90 | x | " |
| L15 −1 | 15 | .95 | 1168 | 52 | 28.1 | 26.25 | 10.5 | 2.36 | 1.00 | ✓ | 0.19 |
| −2 | " | .91 | 1341 | 44 | 8.3 | 3450 | 12.7 | 2.05 | 1.42 | ✓ | " |
| −3 | " | .82 | 1414 | 39 | 6.1 | 3525 | 15.3 | 1.61 | 1.79 | ✓ | " |
| −4 | " | .66 | 1455 | 36 | 3.1 | 3050 | 16.1 | 1.52 | 2.08 | x | " |
| L11 −1 | 20 | .91 | 1153 | 51 | 41.0 | 3100 | 9.5 | 2.09 | 1.21 | ✓ | — |
| −2 | " | .90 | 1260 | 47 | 48.0 | 3275 | 12.0 | 1.77 | 1.17 | ✓ | — |
| −3 | " | .74 | 1382 | 39 | 9.7 | 2625 | 16.7 | 1.58 | 1.58 | ✓ | — |
| −4 | " | .70 | 1450 | 35 | 6.0 | 2350 | 18.7 | 1.52 | 2.12 | x | — |
| L16 −1 | 25 | .88 | 1044 | 54 | 36.3 | 3150 | 10.0 | 2.42 | 0.62 | ✓ | 0.40 |
| −2 | " | .88 | 1160 | 48 | 18.5 | 2900 | 15.4 | 2.40 | 0.62 | ✓ | " |
| −3 | " | .78 | 1251 | 43 | 10.3 | 3100 | 17.7 | 1.93 | 1.16 | ✓ | " |
| −4 | " | .67 | 1329 | 39 | 5.2 | 2700 | 18.6 | 1.66 | 1.50 | ✓ | " |
| L18 −1 | 30 | .95 | 918 | 58 | — | 2625 | 9.4 | 2.41 | 0.60 | ✓ | 0.57 |
| −2 | " | .93 | 1069 | 50 | — | 2900 | 14.3 | 2.35 | 0.70 | ✓ | " |
| −3 | " | .87 | 1140 | 44 | — | 3175 | 16.6 | 1.90 | 0.62 | ✓ | " |
| −4 | " | .73 | 1217 | 41 | — | 3000 | 19.5 | 1.78 | 1.70 | ✓ | " |
| L19 −1 | 35 | .94 | 920 | 55 | 57.6 | 3000 | 8.4 | 2.83 | 0.50 | ✓ | 0.69 |
| −2 | " | .93 | 1075 | 48 | 23.7 | 3275 | 13.3 | 2.37 | 0.60 | ✓ | " |
| −3 | " | .89 | 1138 | 44 | 14.3 | 2900 | 17.1 | 2.39 | 0.90 | ✓ | " |
| −4 | " | .77 | 1243 | 38 | 6.5 | 3100 | 20.7 | 1.89 | 1.12 | ✓ | " |

We claim:

1. A method of manufacturing a cellulose fibre reinforced, high impact strength carbonate building element which comprises steps of:
   (a) mixing solids and water to produce a slurry in which the solids consist essentially of at least one alkali earth oxide or hydroxide and an amount of cellulose fibres in the range 7-40% by weight of solids;
   (b) forming the slurry as a gas permeable shape having voids that contain water and so that the shape has a porosity in the range 35 to 50%, where porosity is the volume of the voids within the shape expressed as a percentage of the volume of the whole shape; and
   (c) causing carbon dioxide gas to permeate into the shape by means of the voids thereby converting the hydroxide(s) to carbonate(s) and imparting high impact strength to the resulting element, this converting step being performed in a short time period dependent on the percentage carbon dioxide present in the processing atmosphere to produce a building element of high impact strength which is not dependent on the presence of aggregate for its impact strength, said period being about 30 minutes for 100 percent carbon dioxide.

2. A method as claimed in claim 1 wherein the cellulose fibres are present in an amount within the range 10-30% by dry weight of solids.

3. A method as claimed in claim 1 wherein the water content, prior to carbonation, is in the range 45-55% by volume of the voids.

4. A method as claimed in claim 1 wherein the alkaline earth metal is calcium.

5. A method as claimed in claim 1 in which the mixing step includes the addition of an amount of polypropylene fibres in the range 0.1 to 5% and having a Young's modulus in the range 200 to 300 kg/mm².

6. A method as claimed in claim 1 in which said alkali earth oxide or hydroxide is calcium hydroxide and the mixing step includes the addition of calcium carbonate particles having sizes less than 200 BS mesh such that the weight ratio of calcium carbonate to calcium hydroxide in the slurry is less that 2:1.

7. A method as claimed in claim 1 in which the mixing step includes the addition of glass fibres for the purpose of increasing the green strength of the matted felt, the addition being such that the amount of glass fibres in the slurry is in the range of 0.5 to 5.0% by dry weights.

8. A method as claimed in claim 1, in which the carbon dioxide gas is comprised in a gas mixture, the concentration being in the range 28 to 100% by volume, and the carbonation period being in the range 30 minutes to 2½ hours.

9. A method as claimed in claim 8 in which the concentration of the carbon dioxide is 28% and the carbonation period is 2½ hours.

10. The method of any one of claims 1-9 wherein the cellulose fibers are approximately 15% by weight of solids and the shape has a porosity in the range of approximately 36 to 44%.

* * * * *